INVENTOR.
CORNELIS VAN DER LELY
BY
Mason, Mason & Albright
ATTORNEYS

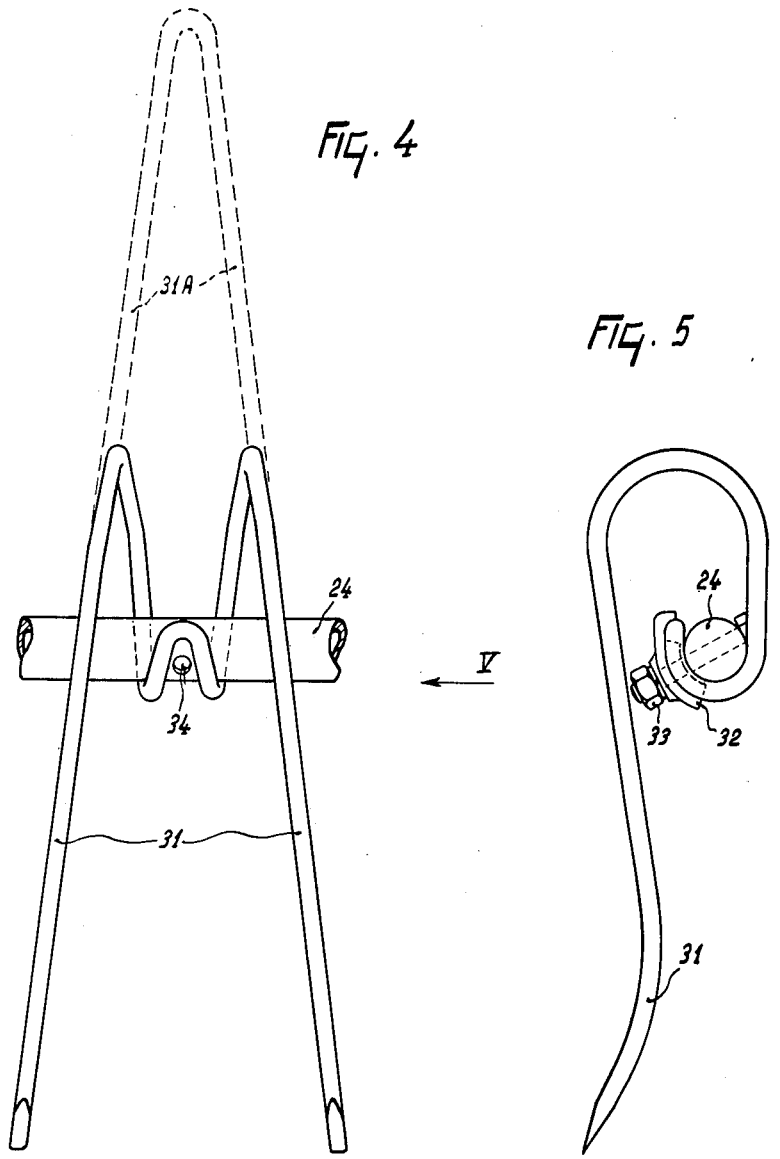

3,223,177
SWAY LIMITING MEANS FOR A TOOL MOUNTED ON A MAST TYPE HITCH
Cornelis van der Lely, Zug, Switzerland, assignor to Patent Concern N.V., Willemstad, Curacao, Switzerland, a limited-liability company of the Netherlands Antilles
Filed July 18, 1961, Ser. No. 124,891
Claims priority, application Netherlands, July 28, 1960, 254,315
13 Claims. (Cl. 172—449)

This invention relates to a soil-tilling implement and is concerned with a harrow having soil-engaging tines.

According to a first aspect of the present invention, there is provided a harrow having a frame portion arranged for connection to a tractor or the like for moving the harrow along the ground, at least one tined harrow section connected thereto, by means arranged to allow said section to make reciprocatory movements during operation, these movements being substantially parallel to the ground and having a component in a direction transverse to the direction of travel in operation. The reciprocatory movements enable the soil to be thoroughly worked and broken up, and facilitate the disengagement or shedding of weeds and the like which may be carried along by the tines.

For a better understanding of the invention and to show how the same may be carried into effect, reference will now be made, by way of example, to the accompanying drawings, in which:

FIGURE 4 is a front elevation of a detail of the harrow; and

FIGURE 5 is a side view of the detail, as seen in the direction of the direction of the harrow V in FIGURE 4.

Figure 1:
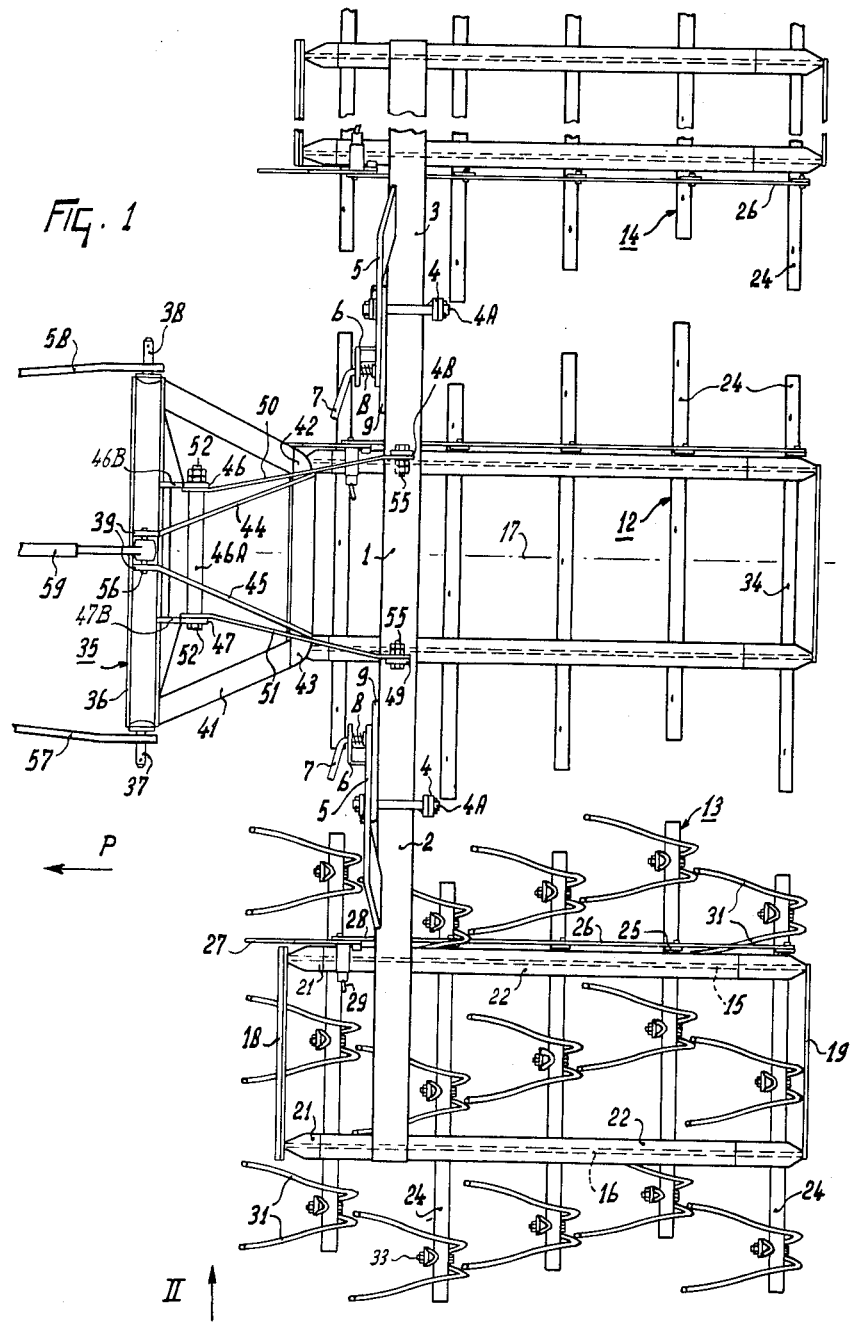
FIGURE 1 is a plan of a harrow connected to a three-point lifting device of a tractor and occupying a working position, parts of the implement having been removed.
Figure 2:
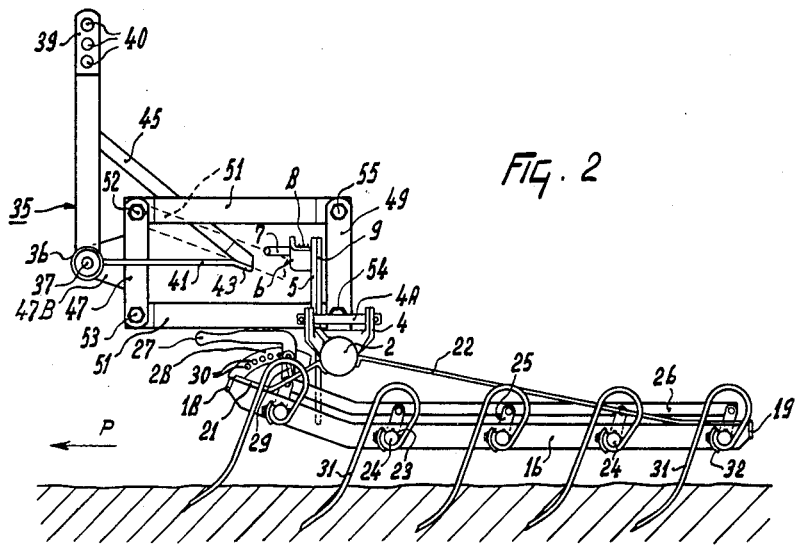
FIGURE 2 is a side elevation of the harrow, as seen in the direction of the arrow II in FIGURE 1.
Figure 3:
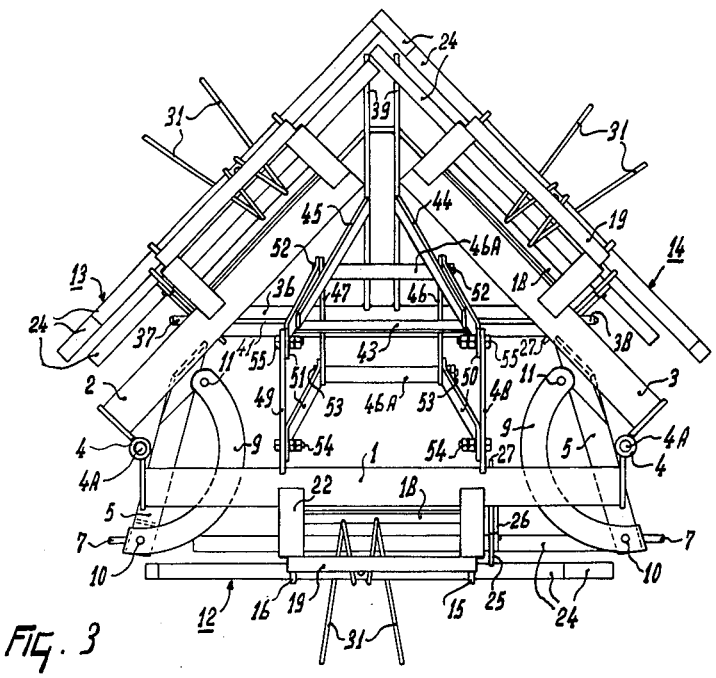
FIGURE 3 is a rear view of the harrow in a raised, transport position.

As shown in FIGURES 1, 2 and 3, the implement has a frame including a frame portion consisting of beams 1, 2 and 3, the beams 2 and 3 being pivotally connected to respective ends of the beam 1. The beams 2 and 3 are arranged to pivot with respect to the beam 1 about the hinge pins 4A of hinges 4. Right-angled lugs 6 are fastened to curved strips 5 which, in turn, are fastened one to each of the beams 2 and 3. An arcuate strip 9 is fastened near each end of the beam 1 so that its center lies on the axis of the respective hinge pin 4A. Holes 10 and 11 (FIGURE 3) are formed in each strip 9 near its ends. The strip 9 extends close to the respective strip 5, and a locking pin 7 may be passed through holes formed in the strip 5 and the lug 6, and through either of the holes 10 and 11 in the respective arcuate strip 9. The locking pin 7 is retained in position in the hole 10 or 11 by a spring 8 encircling the pin and bearing against the lug 6 and against a fixed collar on the pin. Thus each of the beams 2 and 3 can be fixed with respect to the beam 1 in either of two positions about the axis of the respective hinge pin 4A.

As may be seen from FIGURE 1, the beams 1, 2 and 3 have connected thereto harrow sections 12, 13 and 14, respectively. These harrow sections are identical and they will be described hereinafter with reference to the section 13. The latter has a frame including two longitudinal beams 15 and 16, each of which extends obliquely upwardly towards the forward end thereof. The longitudinal beams 15 and 16 are connected with each other at their ends by two strips 18 and 19 extending substantially parallel to the beam 2. The longitudinal beams 15 and 16 are secured to the beam 2 with the aid of flat bars 21, each of which extends forwardly from the beam 2, and of flat bars 22, extending rearwardly from the beam 2. As shown in FIGURE 2, the flat bars 21 and 22 are bent so that they may be secured to the beams 15 and 16 and to the beam 2. The beams 15 and 16 are formed with a number of aligned holes which constitute bearings 23 for the rotatable mounting of rods 24. These rods 24 are equidistantly spaced along the beams 15 and 16, and are off-set with respect to one another, as seen in the intended direction of movement of the implement, so that the rods project on either side of the beams 15 and 16 by different distances.

The rods 24 are each provided with an upstanding finger 25 located close to the beam 15. The fingers 25 are of equal length and their free ends are aligned so that they may be coupled by a control rod 26 which is connected at one end to a control lever 27. The latter is pivotally mounted on the frame of the harrow section and can be adjusted along an arcuate strip 28 arranged on the beam 15. The control lever 27 can be locked in a selected one of a number of positions by a pin 29 which may be passed through a hole in the lever 27 and a selected one of a number of holes 30 formed in the strip 28.

Each rod 24 constitutes a support for a number of pairs of tines 31 which are secured to the supports by clamping pieces 32 and bolts 33 (see FIGURE 5). In FIGURE 4, the clamping piece 32 and the bolt 33 have been removed to show a hole 34 in the rod 24, through which hole the bolt 33 is passed. Each pair of tines 31 is made from a single piece of spring steel wire by bending the same into the form of a V (as is indicated in broken lines at 31A in FIGURE 4), and thereafter beinding the parts of the wire adjacent the apex of the V into the curved form shown in FIGURES 4 and 5 in full lines, the ends of the arms of the V being curved as shown in FIGURE 5.

An assembly 35 is provided on the forward side of the harrow for connecting the same to the three-point lifting device of a tractor or the like for moving the harrow along the ground. The connecting assembly 35 includes a substantially horizontal beam 36 which extends parallel to the beam 1 and which has pins 37 and 38 secured to its ends. A vertical support 39 is secured to the center of the beam 36, the support consisting of two parallel posts secured at their lower ends to the beam 36. The upper end of the support 39 is formed with a plurality of holes 40.

A supporting member 41 is secured to the beam 36 on the side adjacent the harrow sections 12, 13 and 14, the supporting member and the beam 36 together forming a structure in the shape of a trapezium. The corners 42 and 43 of this trapezium are connected to the upper end of the vertical support 39 with the aid of rods 44 and 45. The side of the trapezium between the corners 42 and 43 is bent downwardly to a small extent as shown in FIGURE 2. Two supporting posts 46 and 47 are connected by web plates 46B and 47B, respectively, to the beam 36 at equal distances from the center thereof. The supports 46 and 47 extend above and below the beam 36 and their ends are connected by rods 46A. Corresponding supports 48 and 49 are secured to the beam 1 so as to be positioned at equal distances from the center of the beam. The supports 46 and 48 are interconnected by strips 50, and the supports 47 and 49 are interconnected by strips 51, the strips 50 and 51 being of resilient material. The resilient strips 50 and 51 are capable of pivoting about their connections with the supports 46, 47, 48 and 49. Therefore there is produced, in effect, a parallelogram link structure having links formed by the supports 46, 47, 48 and 49 and by the strips 50 and 51, the pivotal connections of the links being located at the points 52, 53, 54 and 55 (FIGURE 2). Thus the harrow has a frame having two portions, one portion being arranged for connection to the three-point lifting device of a tractor or the like. The other frame portion consists of the beams 1, 2 and 3, with which the tined harrow sections are coupled. The two frame portions are connected together by the structure including the resilient strips 50 and 51. It is apparent from FIGURE 2 that the points 54 and 55, at which the strips are connected to the supports, are located behind the foremost tines of the harrow sections. The distance between the supports 48 and 49 on the beam 1 is greater than the distance between the supports 46 and 47 on the beam 36, so that the resilient strips 50 and 51 diverge from each other as they extend from the supports 46 and 47 toward the frame of the harrow. It will be seen from FIGURE 1 that the frame portions of the harrow, the strips 50 and 51 of the connecting structure and the harrow sections are all symmetrically placed about the longitudinal center line of the implement, which center line is indicated in chain-dotted line at 17.

The lifting device of the tractor has two, lower, substantially co-planar lift links 57 and 58, and an upper lift link 59 (FIGURE 1).

In use, the connecting assembly 35 of the implement is mounted on the three-point lifting device of a tractor or the like with the aid of the pins 37 and 38 and of a further pin 56. The pins 37 and 38 are connected to the ends of the lower lift links 57 and 58, and the pin 56 is passed through a selected one of the holes 40 in the vertical support 39 and through a hole in the end of the upper lift link 59.

In operation, the implement is propelled by the tractor or the like in the direction indicated by the arrow P in FIGURES 1 and 2, the implement being in the working position as illustrated in these figures. The tines 31 are thus dragged through the soil, which is thereby loosened. The coupling member arranged between the frame portion 35 and the harrow sections, and comprising the resilient, pivotal strips 50 and 51, allows a reciprocating movement to be set up during operation. By "a reciprocating movement" is meant a movement of the harrow sections with respect to the tractor or the like in a direction transverse to the direction of travel. It is found that this movement produces a better working of the soil than if the harrow were drawn through the ground in a straight line. Also, weeds and the like which tend to adhere to the tines, are readily detached therefrom by this reciprocating movement. The obliquely upwardly extending rods 44 and 45 constitute limiting means for the reciprocating movement since excessive movement causes the strips 50 and 51 to come into contact with the rods 44 and 45.

As described above, the harrow sections 12, 13 and 14 carry pairs of spring steel tines 31. As may be seen from FIGURE 2, the tines are bent over the respective supports 24 in the intended direction of travel of the implement from their connections with the supports. Each tine extends obliquely downwardly, again in the intended direction of travel, and the lower end of each tine is bent forwardly in such direction. In each harrow section, the supporting rod 24 which is located forwardly of the others is disposed at a higher level than the other supports since it is mounted on the upwardly extending parts of the beams 15 and 16. Therefore the tines 31 provided on this support are arranged so that they do not penetrate as deeply as do the other tines. This arrangement is important since the leading tines are subjected to a greater stress in operation than are the other tines. By virtue of the shape and of the fastening of the tines, any weeds or the like which are carried along by the tines during operation are moved upwardly along the tines and are disengaged at the top thereof; i.e. the implement is self-cleaning. Therefore, in general, it is not necessary to interrupt operation of the implement to free the same from adhering weeds or the like.

The position of all of the tines 31 in a section can be adjusted simultaneously by movement of the corresponding lever 27 along the arcuate strip 28. Adjustment of the lever 27 causes longitudinal movement of the rod 26 which in turn causes the fingers 25 to pivot. Thus, the supporting rods 24 are turned in their bearings 23 so as to adjust the inclination of the tines 31 to the ground. In the case of a heavy soil, the tines are adjusted so that they lie flatter; i.e. they are more nearly horizontal, than in the case of a lighter soil. When soil which has been neglected is to be harrowed, the tines should be more nearly horizontal in this case also so that the weeds or the like may be more readily disengaged from the tines.

The position of the implement shown in FIGURE 3 is the position for transport. To bring the implement to the transport position, the lifting device of the tractor is first raised. The connecting assembly 35 and the supporting member 41 are therefore raised, as are the rods 44 and 45 and the supports 46 and 47. The links 50 and 51 pivot about their connections 52 and 53 with the supports 46 and 47 until the upper link of each of the parallelograms rests against the downwardly bent portion of the supporting member 41; i.e. until the upper links reach a position indicated in broken lines in FIGURE 2 for one of the links 51. During this pivotal movement, the harrow sections remain in the positions on the ground which they occupy when in use. Continued lifting of the lifting device then lifts the harrow sections from the ground since the strips 50 and 51 are prevented from further movement with respect to the assembly 35 by the supporting member 41. As may be seen from FIGURE 3, when the upper links of the parallelograms rest on the supporting member 41, these links are disposed outwardly of the rods 44 and 45 and lie close thereto. Therefore lateral movement of the implement when in the raised position is minimized. In the raised position, the beams 1, 2 and 3 are aligned as they are when they are in use, but are lifted from the ground. In order to reduce the width of the implement for the transport, the pins 7 are removed from the holes 11 in the arcuate strip 9, and each of the beams 2 and 3 is turned about the respective hinge pin 4A at the end of the beam 1 until it reaches the position shown in FIGURE 3. The pins 7 are then replaced in the holes 10 in the arcuate strip 9. The arrangement is such that in this position, the ends of the supporting rods 24 bear one against the other at the top, so that a compact, rigid, triangular assembly is produced.

Since the rods 24 are staggered in each harrow section with reference to the intended direction of travel, each harrow section has a greater working width than the length of a single supporting rod 24. The supporting rod 24 may be manufactured in a simple manner since the holes 34 for accommodation of the bolts 33 are simply drilled therein at the requisite distance apart and the actual positions of the tines 31 are determined by the staggered positions of the supporting rods 24. As the tines 31 are staggered in relation to one another, it is ensured that the whole of the working width of each harrow section is covered during operation.

What I claim is:

1. A soil-tilling implement comprising a three-point hitch and supporting portion adapted to be connected to the conventional three-point linkage of a prime mover in raised transport position and lowest earth-working positions, a soil tilling portion laterally spaced, vertically disposed pairs of substantially parallel links pivotally connected to the hitch portion on a substantially horizontal transverse axis, said links extending rearwardly from the hitch portion and pivotally connected to the tilling portion on a substantially horizontal transverse axis, said links being constructed of flexible strip elements and connecting the tilling portion with the hitch portion, whereby said link and tilling portion are laterally movable during the lowered earth-working position, stabilizing rod means connected to said hitch portion and defining a pair of opposed contact surfaces extending downwardly and diverging outwardly between said laterally spaced links, said contact surfaces providing abutments engaging at least one link of each of said pair for limiting the lateral movement of the links and tilling portion in the raised transport position.

2. The invention of claim 1 wherein the links are symmetrically placed about the longitudinal center line of the implement.

3. The invention of claim 1 wherein said links comprise two pivoted strip elements and the stabilizing rod means includes rods extending downwardly and diverging outwardly between said strip elements.

4. The invention of claim 3 wherein the strip elements are pivoted about axes extending transversely to the direction of travel.

5. The invention of claim 1 wherein the links comprise a pair of spaced pivoted quadrilateral structures arranged in an angular relationship to each other and said stabilizing rod means includes rods which extend downwardly and diverge outwardly between said quadrilateral structures.

6. The invention of claim 5 wherein the quadrilateral structures are pivoted about an axis extending transversely to the direction of travel, rod means on the hitch portion connecting structures.

7. The invention of claim 5 wherein the quadrilateral structures are in the form of parallelogram structures.

8. The invention of claim 5 wherein the quadrilateral structures comprise a pair of pivoted parallelograms of articulated resilient strip elements.

9. The invention of claim 8 wherein the parallelograms are in substantially horizontal alignment and spaced from one another.

10. The invention of claim 8 wherein the parallelograms are symmetrically placed about the longitudinal center line of the tilling implement.

11. The invention of claim 8 wherein the hitch and supporting portion includes an upright support secured to a substantially horizontal beam and the rods extend downwardly from said support, supporting means extending substantially horizontally from the beam through said parallelograms and being connected to the rods.

12. The invention of claim 11 wherein the supporting means forms a substantially horizontal trapezium whereby the rods restrict the lateral movement of the quadrilateral structures during transport of the implement.

13. The invention of claim 11 wherein supporting plates rigidly connect the beam and one side of said parallelograms.

References Cited by the Examiner

UNITED STATES PATENTS

| | | | |
|---|---|---|---|
| 2,109,677 | 3/1938 | Morkoski | 172—457 |
| 2,533,542 | 12/1950 | Walz et al. | 172—307 X |
| 2,569,389 | 9/1951 | Seaholm | 172—307 |
| 2,583,897 | 1/1952 | Smeds | 172—450 X |
| 2,653,825 | 9/1953 | Collins | 172—450 X |
| 2,712,718 | 7/1955 | Love | 172—446 |
| 2,751,834 | 6/1956 | Hines et al. | 172—307 X |
| 2,751,836 | 6/1956 | Oehler et al. | 172—298 |
| 2,765,723 | 10/1956 | Clarke et al. | 172—449 X |
| 2,782,703 | 2/1957 | Chambers et al. | 172—449 X |
| 2,815,704 | 12/1957 | Bloom et al. | 172—448 X |
| 2,888,997 | 6/1959 | Fraga | 172—449 X |
| 2,935,147 | 5/1960 | Edman et al. | 172—450 |
| 2,963,096 | 12/1960 | Fischer | 172—198 |
| 2,987,126 | 6/1961 | Horney | 172—450 |
| 2,990,893 | 7/1961 | Bland | 172—449 X |

FOREIGN PATENTS 737,135  9/1955  Great Britain.

ABRAHAM G. STONE, *Primary Examiner.*

A. JOSEPH GOLDBERG, ANTONIA F. GUIDA, T. GRAHAM CRAVER, *Examiners.*